(12) United States Patent
O'Lenick, Jr.

(10) Patent No.: US 7,118,735 B1
(45) Date of Patent: Oct. 10, 2006

(54) COSMETIC COMPOSITION

(75) Inventor: Anthony J. O'Lenick, Jr., Dacula, GA (US)

(73) Assignee: Zenitech LLC, Old Greenwich, CT (US)

( * ) Notice: Subject to any disclaimer, the term of this patent is extended or adjusted under 35 U.S.C. 154(b) by 0 days.

(21) Appl. No.: 11/321,524

(22) Filed: Dec. 30, 2005

Related U.S. Application Data

(63) Continuation-in-part of application No. 11/002,363, filed on Dec. 3, 2004, now Pat. No. 7,038,005.

(51) Int. Cl.
*A61K 8/72* (2006.01)
*C08G 63/02* (2006.01)
*C08J 7/00* (2006.01)

(52) U.S. Cl. ............... 424/70.11; 424/59; 424/61; 424/63; 424/64; 424/69; 424/70.1; 424/70.6; 424/70.7; 424/401; 525/275

(58) Field of Classification Search .......... 424/59, 424/61, 63, 64, 69, 70.1, 70.6, 70.7, 70.11, 424/401; 524/275
See application file for complete search history.

(56) References Cited

U.S. PATENT DOCUMENTS

| | | | |
|---|---|---|---|
| 4,868,236 A * | 9/1989 | O'Lenick, Jr. ............... 524/308 |
| 5,488,121 A * | 1/1996 | O'Lenick, Jr. ............... 554/167 |
| 5,786,389 A * | 7/1998 | O'Lenick et al. ........... 514/552 |
| 6,342,527 B1 * | 1/2002 | O'Lenick et al. ........... 514/547 |
| 6,537,531 B1 * | 3/2003 | Gardner et al. ............... 424/69 |
| 6,706,259 B1 * | 3/2004 | Gardner et al. .......... 424/70.31 |

* cited by examiner

Primary Examiner—Samuel A. Acquah

(57) ABSTRACT

Disclosed herein is a composition, for example, a cosmetic care and/or makeup composition for a keratin material, comprising, in a cosmetically acceptable medium, i) at least one polyester resulting from esterification of at least one Guerbet capped polyester ii) at least one oil of a molar mass ranging from 650 to 10,000 g/mol, and iii) at least one colorant. The composition may possess cosmetic properties and can, for example, endow the makeup or care product with properties of gloss, smoothness of application and comfort. Further disclosed herein is the use of the at least one polyester and the at least one oil with a molar mass ranging from 650 to 10,000 g/mol in a physiologically acceptable composition as an agent for endowing the composition with properties of slip, gloss, comfort, definition, non-migration, enhanced color intensity and/or enhanced color retention after challenge. The compositions unlike those made from oxidatively inferior triglycerides do not form degradative odor bodies during storage and use, making them superior to all other materials.

11 Claims, No Drawings

COSMETIC COMPOSITION

RELATED APPLICATION

This application is a CIP of Ser. No. 11/002,363 filed Dec. 3, 2004, now U.S. Pat. No. 7,038,005.

FEDERAL SPONSORSHIP

None

FIELD OF THE INVENTION

Disclosed herein is a cosmetic makeup and/or care composition for skin, including scalp, of both face and body, lips or the epidermal derivatives of humans, such as hair, eyelashes, eyebrows and nails, which comprises, in a cosmetically acceptable medium, at least one specific polyester. This composition can have notable cosmetic properties and can endow the makeup or care product with at least one property chosen from properties, for example, of slip, gloss, comfort, outline definition, non-migration, enhanced color intensity and enhanced color retention after challenge. The compositions unlike those made from oxidatively inferior triglycerides do not form degradative odor bodies during storage and use, making them superior to all other materials.

BACKGROUND OF THE INVENTION

U.S. patent application 20040241198 to Blin, Xavier; et al. discloses Cosmetic composition comprising at least one polyester resulting from esterification of at least one triglyceride of hydroxylated carboxylic acid(s) and at least one oil with a molar mass of 650 to 10 000 g/mol. The composition of the present invention unlike the application of Bin discloses polyesters with extraordinary oxidative stability, making them far superior to the triglyceride based products of Bin.

We have also found that the Guerbet capped polyesters are outstanding and surprisingly oxidatively stable when used together with so called "pasty compounds". The term "pasty compound" has been used commonly in the are to mean a lipophilic fatty compound, which exhibits a reversible solid/liquid state change and, in the solid state, has an anisotropic crystalline organizational structure, and which, at a temperature of 23° C., comprises a liquid fraction and a solid fraction. An example of such a use is found in United States Patent Application 20040241121 Blin, Xavier; et al. Dec. 2, 2004

In one embodiment, the composition disclosed herein may constitute a makeup product for the body, lips or epidermal derivatives of humans which may have properties, for example, of non-therapeutic treatment and/or care. For example, the composition disclosed herein may constitute a lipstick or lip gloss, a blusher or eye shadow, a tattooing product, a mascara, an eyeliner, a nail varnish, an artificial tanning product for the skin or a hair care or hair coloring product.

Numerous cosmetic compositions exist for which gloss properties in the deposited film are desirable following its application to keratin materials (such as skin, lips, epidermal derivatives). Examples that may be mentioned include lipsticks, nail varnishes and certain hair products.

From this viewpoint, a formulator may have a number of types of base materials at his or her disposal, such as lanolins, which may be used in combination with what are termed as "gloss" oils, such as a) polybutenes, which have a high viscosity, b) fatty alcohol or acid esters with a high carbon number (typically greater than 16), c) certain vegetable oils, d) esters resulting from partial or complete esterification of a hydroxylated aliphatic compound with an aromatic acid, as described in patent application EP 1 097 699, e) polyesters obtained by sequential reaction of castor oil with isostearic acid and then with succinic acid, which are described in U.S. Pat. No. 6,342,527, and the Guerbet capped polyesters of the present invention. Surprisingly, only the Guerbet capped polyesters of the present invention provide the oxidative stability necessary to product truly odor free personal care products In one embodiment, disclosed herein is a glossy cosmetic care and/or makeup composition for keratin materials, such as skin, lips and epidermal derivatives, which can have improved properties relative to the cosmetic compositions of prior art. For example, deposition of the composition disclosed herein on the keratin materials can be more sharply defined and its color retention can be enhanced.

In one embodiment, the present inventors have found that the use i) of at least one Guerbet capped polyester the topic of Ser. No. 11/002,363 filed Dec. 3, 2004, incorporated herein by reference, with ii) at least one (i.e., one or more than one) oil with a molar mass ranging from 650 to 10 000 g/mol, makes it possible to obtain a cosmetic composition which can be glossy on application and over time, can exhibit at least one property chosen from good application properties, good properties of spreading, of color retention after challenge, of comfort (no tightening or drying out) and of non-migration and whose outlines, when deposited on keratin materials, can be well defined and whose color intensity can be enhanced.

The oil with a molar mass ranging from 650 to 10 000 g/mol is referred to herein as an oil of high molar mass.

In one embodiment, disclosed herein is a composition comprising, in a cosmetically acceptable medium, i) of at least one Guerbet capped polyester the topic of Ser. No. 11/002,363 filed Dec. 3, 2004, incorporated herein by reference, ii) at least one oil of a molar mass ranging from 650 to 10 000 g/mol, and iii) at least one colorant.

In another embodiment, disclosed herein is a cosmetic method of endowing a film of a cosmetic composition with at least one property chosen from gloss on application and over time, good application properties and good properties of spreading, of color retention following challenge, of comfort (no tightening or drying out) and of non-migration, with outlines which, when deposited on keratin materials, are well defined, and with enhanced color intensity, wherein the method comprises including in the composition i) of at least one Guerbet capped polyester the topic of Ser. No. 11/002,363 filed Dec. 3, 2004, incorporated herein by reference, with ii) at least one oil of a molar mass ranging from 650 to 10 000 g/mol, and iii) at least one colorant.

In yet another embodiment, disclosed herein is the use of the combination of i) of at least one Guerbet capped polyester the topic of Ser. No. 11/002,363 filed Dec. 3, 2004, incorporated herein by reference, with and ii) at least one oil of a molar mass ranging from 650 to 10,000 g/mol, in a physiologically acceptable composition comprising at least one colorant for endowing the composition with at least one property chosen from gloss on application and over time, good application properties and good properties of spreading, of outline definition, of comfort (no tightening or drying out) and of non-migration, with enhanced color intensity and with enhanced color retention after challenge, and to provide unexpected oxidatively stability heretofore unknown in the art.

In one embodiment, the composition disclosed herein is free of lanolin or lanolin derivatives.

As disclosed herein, the term "lanolin derivatives" means, for example, liquid lanolin, reduced lanolin, lanolin purified by adsorption, lanolin acetate, lanolin wax, for example the oxypropylenated (5 PO) lanolin wax sold as Emery 1695 by Cognis, isopropyl lanolate, liquid lanolin acetate, hydroxylanolin, polyoxyethylene-lanolin, lanolin fatty acid, hard lanolin fatty acid, cholesteryl esters of lanolin fatty acid, lanolin alcohol, and lanolin alcohol acetate.

In another embodiment, the composition disclosed herein comprises at least one pasty compound other than lanolin derivatives.

The Guerbet capped polyester is the topic of Ser. No. 11/002,363 filed Dec. 3, 2004, incorporated herein by reference.

In one embodiment, the at least one polyester disclosed herein is liquid at ambient temperature (generally ranging from 20° C. to 25° C.) and atmospheric pressure (760 mm Hg).

In another embodiment, the Guerbet capped polyester disclosed herein has a viscosity at 25° C. of more than 500 cP (50 Pa·s), such as ranging from 900 to 10,000 cP (90 to 1000 Pa·s) and further such as from 950 to 5,000 cP (95 to 500 Pa·s). Viscosity, as used herein, is measured with a Brookfield RV or Brookfield "DV-II+" viscometer of type LV equipped with a No. 1 spindle rotating at a speed ranging from 0.5 rpm to 10 rpm. This viscosity measurement is taken when the measurement value has stabilized, generally after 10 minutes.

In another embodiment, the Guerbet capped polyester disclosed herein has a refractive index greater than or equal to 1.47, such as from 1.47 to 1.55, and further such as from 1.48 to 1.55 (wherein the refractive index is defined for the sodium D line). The refractive index is measured at 20° C. by reference to D Ray sodium (589 nm) according to, for example, ASTM Standards D 1218-92, D1500.

According to one embodiment, the Guerbet capped polyester is obtained by two esterification reactions of at least one diol, one diacid and a Guerbet alcohol.

The Guerbet capped polyester conforms to the following structure:

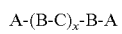

wherein:

A is

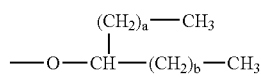

wherein;

a in an integer ranging from 3 to 11;

b in an integer ranging from 5 to 19, with the proviso that b=a+2;

B is —C(O)—CH$_2$—CH$_2$—C(O)—

C is a mixture of compounds conforming to the following structure:

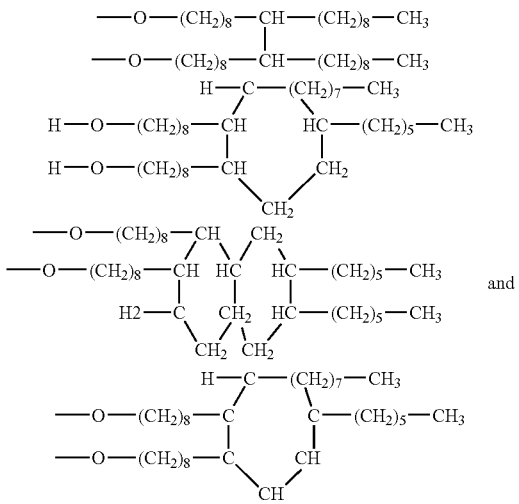

wherein;

x is an integer ranging from 3 to 40.

As should be readily understood the succinic acid (HO—C(O)—(CH$_2$)$_2$—C(O)OH) is a diacid that will react with hydroxyl groups to make esters. It will react with the various diols making up the dimer alcohol to make polyesters, that is each succinic carboxyl group will react with each hydroxyl group Lacking the essential Guerbet alcohol the resulting polymer would be simply a nonending polymer -(B-C)$_x$-. The viscosity would climb to very high levels and the product would be too thick to be functional.

The Guerbet alcohol is monofunctional providing a chain terminator and a way to control the molecular weight. The specific branched alcohol also provides low viscosity and gloss. This allows for the preparation of a high molecular weight low viscosity polymer which is highly prized in the cosmetic business. By regulating the ratio of Guerbet alcohol reacted the molecular weight is regulated, the more Guerbet, the lower the molecular weight.

The Guerbet capped polyester isprepared by the esterification reaction of (a) a Guerbet alcohol conforming to the following structure:

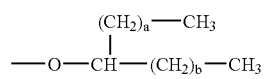

wherein;

a in an integer ranging from 3 to 11;

b in an integer ranging from 5 to 19, with the proviso that b=a+2;

(b) succinic acid conforming to the following structure:

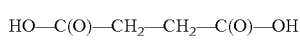

and (c) dimer alcohol, a mixture of compounds conforming to the following structure:

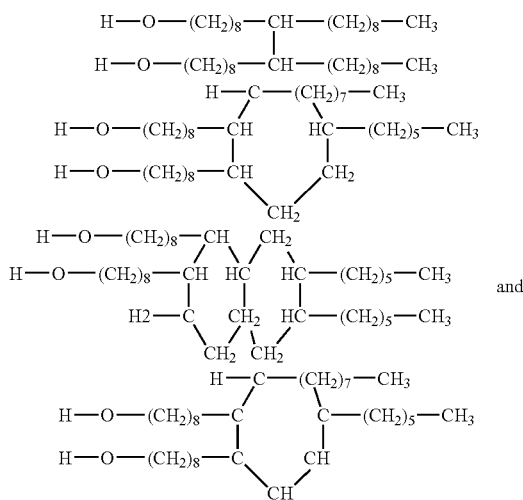

wherein;

x is an integer ranging from 3 to 40.

PREFERRED EMBODIMENTS

In a preferred embodiment the esterification reaction is carried out at a temperature of between 150 and 200° C. for four to eight hours.

In a preferred embodiment a is 3 and b is 5.
In a preferred embodiment a is 7 and b is 9.
In a preferred embodiment a is 9 and b is 11.
In a preferred embodiment a is 11 and b is 13.
In a preferred embodiment a is 13 and b is 15.
In a preferred embodiment a is 15 and b is 17.
In a preferred embodiment a is 17 and b is 19.

In a preferred embodiment the composition is in a form chosen from lipsticks, lipglosses, blushers, eyeshadows, mascaras, eyeliners, nail varnishes, artificial skin tanning products, haircare products, hair coloring products.

In a preferred embodiment the colorant is chosen from dyes, which are soluble or dispersible in the composition, pigments, and nacres.

In a preferred embodiment the composition further comprises at least one wax chosen from polyethylene waxes with a molecular weight ranging from 400 to 800 g/mol.

EXAMPLES

Raw Materials Reactant 1—Guerbet Alcohols

Guerbet Alcohols are regiospecifically beta branched alcohols. They have been known since the 1890's when Marcel Guerbet first synthesized them. (M. Guerbet, C. R. Acad. Sci. Paris, 128, 511; 1002 (1899)). These materials are high in molecular weight and are liquid to very low temperatures. The Guerbet reaction gives very specific branching, on the second carbon from the hydroxyl group. This branching has been found to be critical to the preparation of a product having the desired lubrication and oxidative stability properties. If the branching were on the same carbon as the hydroxyl group, the hydroxyl group would be a secondary one and would be very hindered and has low reactivity. As one moves the branch position away from the beta carbon, the liquidity, lubricity and metal substantivity decreases. If the branch is lower alkyl like methyl in some oxo alcohols, there is little increase in the liquidity, lubricity and metal substantivity over normal alcohols having the same number of carbons. Additionally, the oxo process gives only some beta branching (between 1 and 28%) the Guerbet process gives essentially 100% product. Guerbet alcohols that are the reaction product of one specific raw material alcohol will result in a so-called "homo-Guerbet". In this case R and R' are identical. If the starting alcohols used in the Guerbet reaction are of differing molecular weights a so-called "hetero-Guerbet" results. This type of Guerbet has a mixed distribution of all possible combinations of alcohols. For this reason R and R' in the generic formula may be the same or different.

Guerbet alcohols are available commercially from Sassol Corporation, formerly called Condea Vista. Guerbet alcohols conform to the following structure:

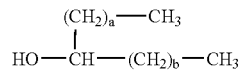

wherein;

a in an integer ranging from 3 to 11;

b in an integer ranging from 5 to 19.

It should be clear from the reaction sequence that the Guerbet alcohol is reacted into the ester, making a new-branched ester and leaving a free lanolin alcohol. The resulting composition contains a branched ester and an alcohol that is derived from the lanolin. The selection of the Guerbet and wax determines the melting point and the degree of hardness of the wax. This is very important in a variety of applications, like automotive polishes, and personal care products like lipsticks.

Guerbet Alcohol Examples

| Example | Designation | a | b |
|---|---|---|---|
| 1 | Guerbet C12 | 3 | 5 |
| 2 | Guerbet C16 | 5 | 7 |
| 3 | Guerbet C20 | 7 | 9 |
| 4 | Guerbet C24 | 9 | 11 |
| 5 | Guerbet C28 | 11 | 13 |
| 6 | Guerbet C32 | 13 | 15 |
| 7 | Guerbet C36 | 15 | 17 |
| 8 | Guerbet C40 | 17 | 19 |

Reactant 2—Succinic Acid

Succinic acid is an item of commerce and conforms the following structure:

Reactant 3-Dimer Alcohol

Dimer alcohol is provided by a variety of sources including Jarchem. It is a composition containing the following components:

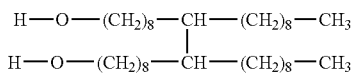

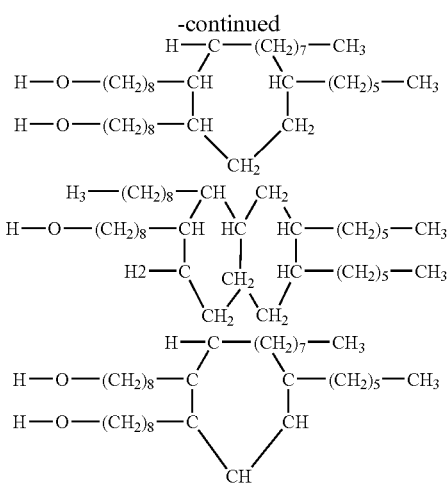

Ester Synthesis

The esterification reaction is carried out using the specified amount of dimer alcohol, succinic acid and the specified amount of the specified Guerbet alcohol. The esterification reaction can be carried out with or without catalyst, however when no catalyst is used the reaction times are protracted. Catalysts like benzene sulfonic acid, tin, sulfuric acid, tin salts and the like can be used. The most satisfactory catalyst is stannous oxylate.

General Procedure

In a suitable reaction flask with agitation, heat and thermometer is added the specified number of grams of dimer alcohol is added the specified number of grams of succinic acid. Next add the specified amount of the specified Guerbet alcohol (examples 1–8). Next add 0.1% stannous oxylate based upon the total weight of the batch after all ingredients have been charged, under agitation. The temperature of the mass is raised to 195–200 C off. The reaction mass is held at this temperature for between 4 and 15 hours, until the acid value drops to vanishingly small values.

| Value Example | Guerbet Alcohol Example | Grams | Dimer Alcohol Grams | Succinic Acid Grams | x |
|---|---|---|---|---|---|
| 9 | 1 | 376.0 | 807.0 | 464.0 | 3 |
| 10 | 2 | 488.0 | 1345.0 | 696.0 | 5 |
| 11 | 3 | 600.0 | 1883.0 | 812.0 | 7 |
| 12 | 4 | 712.0 | 3228.0 | 1506.0 | 12 |
| 13 | 5 | 824.0 | 4035.0 | 1865.0 | 15 |
| 14 | 6 | 936.0 | 1345.0 | 696.0 | 5 |
| 15 | 7 | 224.0 | 2690.0 | 1276.0 | 40 |
| 16 | 8 | 1160.0 | 5380.0 | 2436.0 | 20 |

The products are used without additional purification.

The polyesters of the present invention are high molecular weight, non-irritating esters that provide gloss and emolliency to skin. The high molecular weight as well as low viscosity make the materials ideal as a oil in which to grind pigments/

High Molecular Mass Oil

In one embodiment, the composition disclosed herein further comprises at least one oil of high molar mass, ranging from 650 to 10,000 g/mol. As disclosed herein, an oil is a non-aqueous, water-immiscible compound, which is liquid at ambient temperature (25° C.) and atmospheric pressure (760 mm Hg).

The at least one oil used in the composition disclosed herein may have a molar mass ranging from 650 to 10 000 g/mol, such as from 750 to 7 500 g/mol.

Oils with a molar mass, which is too low, when combined with the at least one polyester disclosed herein, may lead to compositions, which lack sufficient gloss. On the other hand, oils with a molar mass, which is too high, may give rise to compositions, which are considered to be excessively sticky.

For example in some applications, the triglyceride of capric/caprylic acids (such as that sold or manufactured as Estol 3603 MCT oil by Uniqema), which has a molar mass of 494 g/mol, may lead to compositions whose cosmetic properties are inferior to those of the composition disclosed herein.

The at least one oil with a molar mass ranging from 650 to 10 000 g/mol that can be used herein may be chosen, for example, from lipophilic polymers such as polybutylenes such as Indopol H-100 (with a molar mass MM=965 g/mol), Indopol H-300 (MM=1340 g/mol) and Indopol H-1 500 (MM=2160 g/mol), which are sold or manufactured by Amoco, hydrogenated polyisobutylenes such as Panalane H-300 E, sold or manufactured by Amoco (M=1 340 g/mol), Viseal 20000, sold or manufactured by Synteal (MM=6 000 g/mol) and Rewopal PIB 1000, sold or manufactured by Witco (MM=1 000 g/mol), polydecenes and hydrogenated polydecenes such as Puresyn 10 (MM=723 g/mol) and Puresyn 150 (MM=9 200 g/mol), sold or manufactured by Mobil Chemicals, and vinylpyrrolidone copolymers such as the vinylpyrrolidone/1-hexadece-ne copolymer Antaron V-216, sold or manufactured by ISP (MM=7 300 g/mol);

esters such as:

linear fatty acid esters comprising a total carbon number ranging from 35 to 70, such as pentaerythrityl tetrapelargonate (MM=697 g/mol), hydroxylated esters such as polyglycerol-2 triisostearate (MM=965 g/mol), aromatic esters such as tridecyl trimellitate (MM=757 g/mol), and branched $C_{24}$-$C_{28}$ fatty acid and fatty alcohol esters such as those described in document EP-A-0 955 039, such as triisoarachidyl citrate (MM 1 033.76 g/mol), pentaerythrityl tetraisononanoate. (MM=697 g/mol), glyceryl triisostearate (MM=891 g/mol), glyceryl 2-tridecyltetradecanoate (MM=1143 g/mol), pentaerythrityl tetraisostearate (MM=1 202 g/mol), polyglyceryl-2 tetraisostearate (MM=1 232 g/mol) and pentaerythrityl 2-tetradecyltetradecanoate (MM=1538 g/mol);

silicone oils such as phenylsilicones, for instance Belsil PDM 1000 from Wacker (MM=9 000 g/mol);

oils of vegetable origin such as sesame oil (820 g/mol); and mixtures thereof.

In one embodiment, the at least one oil with a molar mass ranging from 650 to 10 000 g/mol that is used in the composition disclosed herein may be present in an amount ranging from 1% to 99% by weight, such as from 10 to 80% by weight, and further such as from 5% to 70% by weight of the total weight of the composition.

The composition disclosed herein may further comprise at least one colorant, which may be chosen from dyes which are soluble or dispersible in the composition, pigments, and nacres. The dyes may, for example, be chosen from fat-soluble dyes, although water-soluble dyes can also be used. The at least one colorant may be present in an amount ranging from 0.001% to 98% by weight, such as from 0.5% to 85% by weight, and further such as from 1% to 60% by weight of the total weight of the composition.

For a composition in paste or cast form, such as a lipstick or a body makeup product, the at least one colorant is present in an amount ranging, for example, from 0.5% to 50% by weight, such as from 2% to 40% by weight, and further such as from 5% to 30% by weight, relative to the total weight of the composition.

The fat-soluble dyes may, for example, be chosen from Sudan Red, b & C Red 17, D & C Green 6, .beta.-carotene, soya oil, Sudan Brown, D & C Yellow 11, D & C Violet 2, D & C Orange 5, quinoline yellow and annatto. They may be present in an amount ranging from 0 to 20% by weight, such as from 0.1% to 6% by weight of the total weight of the composition. The water-soluble dyes may, for example, be chosen from beet juice and methylene blue, and may be present in an amount ranging from 0.1% to 6% by weight of the total weight of the composition (if they are present).

The composition disclosed herein may, for example, comprise a particulate phase, which may, for example, be colored and may be present in an amount ranging from 0.001% to 50% by weight, such as from 0.01% to 40% by weight, and further such as from 0.05% to 30% by weight of the total weight of the composition. The particulate phase may comprise at least one ingredient chosen from pigments, nacres, and fillers, which are commonly used in cosmetic compositions.

As used herein, the term "pigments" means white or colored, organic or inorganic particles, which are insoluble in a liquid fatty phase and are intended for coloring and/or opacifying the composition. The term "fillers" means colorless or white, mineral or synthetic particles, which may be lamellar or non-lamellar. The tem "nacres" means irridescent particles, which are produced, for example, by certain molluscs in their shells, or are synthesized. These fillers and nacres can serve, for example, to modify the texture of the composition.

The pigments may be present in an amount ranging from 0.05% to 30% by weight (if they are present), such as from 2% to 20% by weight of the total weight of the composition. As mineral pigments, which can be used herein, mention may be made, for example, of titanium oxide, zirconium oxide and cerium oxide and also of zinc oxide, iron oxide, chromium oxide and ferric blue. Among the organic pigments, which can be used herein, mention may be made, for example, of carbon black and lakes of barium, strontium, calcium (D & C Red No. 7) and aluminium.

The nacres may be present in an amount ranging from 0.001% to 20% by weight (if they are present), such as from 1% to 15% by weight of the total weight of the composition. Among the nacres, which can be used herein, mention may be made, for example, of mica covered with titanium dioxide, iron oxide, natural pigment or bismuth oxychloride, such as coloured titanium mica, goniochromatic pigments and, for example, multi-layer interference pigments.

The fillers may be present in an amount ranging from 0.001% to 35% by weight (if they are present), such as from 0.5% to 15% by weight of the total weight of the composition. Mention may be made, for example, of talc, mica, kaolin, Nylon® powder (Orgasol in particular) and polyethylene powder, polytetrafluoroethylene (Teflon®) powders, starch, boron nitride, copolymer microspheres such as Expancel® (Nobel Industries), Polytrap® (Dow Corning), Polypore® L 200 (Chemdal Corporation) and silicone resin microbeads (such as Tospearl® from Toshiba), and silica.

The composition disclosed herein may further comprise at least one additional non-aqueous compound other than the at least one polyester and the at least one oil with a molar mass ranging from 650 to 10 000 g/mol. The at least one additional non-aqueous compound may be chosen, for example, from other oils, pastelike fats, waxes, gums, and resins.

In one embodiment, the composition disclosed herein further comprises at least one wax. As disclosed herein, a wax is a lipophilic fatty compound, which is solid at ambient temperature (25° C.), exhibits a reversible solid/liquid state change, has a melting temperature greater than 30° C. and possibly up to 200° C., has a hardness greater than 0.5 MPa, and exhibits anisotropic crystalline organization in the solid state. By taking the wax to its melting temperature, it is possible to make it miscible with the oils and to form a microscopically homogeneous mixture, but by taking the temperature of the mixture to ambient temperature, the wax is recrystallized in the oils of the mixture.

The at least one wax, which can be used herein, can be chosen from compounds which are solid at room temperature and are intended to provide the composition with structure, such as in the form of a stick. The at least one wax may be chosen from hydrocarbon waxes, fluoro waxes and silicone waxes and may be chosen from those of vegetable, mineral, animal and synthetic in origin. For example, the at least one wax disclosed herein may have a melting temperature of greater than 40° C., such as greater than 45° C.

As the wax which can be used herein, mention may be made of those waxes which are generally used in the cosmetics field: they are, for example, of natural origin, such as beeswax, carnauba wax, candelilia wax, ouricuri wax, Japan wax, cork fibre wax, sugarcane wax, rice wax, montan wax, paraffin, lignite wax, microcrystalline wax, ceresin, ozokerite, and hydrogenated oils such as jojoba oil; synthetic waxes, such as polyethylene waxes obtained from polymerization or copolymerization of ethylene with a weight-average molecular mass ranging from 400 to 800 g/mol and mixtures thereof, Fischer-Tropsch waxes, and esters of fatty acids, such as octacosanyl stearate, glycerides which are solid at 40° C. or at 45° C., silicone waxes such as alkyl- or alkoxydimethicones comprising a chain chosen from alkyl and alkoxy chains comprising from 10 to 45 carbon atoms, poly(di)methylsiloxane esters which are solid at 40° C. and whose ester chain comprises at least 10 carbon atoms; and mixtures thereof.

The gums which can be used herein are generally in solubilized form in an oil; the polymers are solid at ambient temperature and the resins may be liquid or solid at ambient temperature.

The nature and amount of the gums, pastelike substances or waxes are a function of the desired mechanical properties and textures. For example, the at least one wax may be present in an amount ranging from 0.01% to 50% by weight, such as from 2% to 40% by weight, and further such as from 5% to 30% by weight of the total weight of the composition.

The at least one additional oil other than the oils with a molar mass ranging from 650 to 10 000 g/mol may be chosen, for example, from hydrocarbon oils, silicone oils and fluoro oils. These oils may be animal, vegetable, mineral or synthetic in origin. As disclosed herein, a hydrocarbon oil is an oil which comprises primarily atoms of carbon and hydrogen and optionally at least one functional group chosen from hydroxyl, ester, ether and carboxyl functional groups. In one embodiment, the at least one additional oil is chosen from oils of vegetable and synthetic origins.

The at least one additional oil may be present in an amount ranging from 0.01% to 90% by weight, such as from 0.1% to 60% by weight, and further such as from 10% to 55% by weight of the total weight of the composition.

The composition disclosed herein may further comprise at least one complementary additive chosen from those commonly used in the field, such as water, antioxidants, preservatives, neutralizers, lipophilic gelling agents, liquid non-aqueous compounds, aqueous-phase gelling agents, dispersants and cosmetic active materials. These additives, with the exception of water, may be present in an amount ranging from 0.0005% to 20% by weight, such as from 0.001% to 10% by weight of the total weight of the composition. Water may be present in an amount ranging from 0 to 70% by weight, such as from 1% to 50% by weight, and further such as from 1% to 10% by weight of the total weight of the composition.

As the cosmetic active materials which can be used herein, mention may be made, for example, of vitamins A, E, C, $B_3$ and F, provitamins such as D-panthenol, active soothing agents such as .alpha.-bisabolol, aloe vera, allantoin, plant extracts and essential oils, protective and restructuring agents such as ceramides, active freshness agents such as menthol and its derivatives, emollients (cocoa butter, dimethicone), moisturizers (arginine PCA), active anti-wrinkle substances, essential fatty acids, sunscreens, and mixtures thereof.

The person skilled in the art can take care to select the nature and/or quantity of any complementary additives such that the advantageous properties of the composition disclosed herein are not, or not substantially, adversely affected by the addition envisaged.

The applications of the compositions disclosed herein can be manyfold and pertain to the entirety of cosmetic products, colored or non-colored, such as lipsticks.

The composition disclosed herein may be in the form of a solid composition, compacted or cast, such as in the form of a stick or dish, or in paste or liquid form. In one embodiment, the composition disclosed herein is present in a solid form, such as in a hard form (a form which does not flow under its own weight), for example, a cast or compact form, such as a stick or dish.

The composition disclosed herein may be present in the form of a paste, solid or cream. It may be an oil-in-water or water-in-oil emulsion, an anhydrous gel which is solid or flexible, or in the form of a loose or compacted powder, and even in a two-phase form. In one embodiment, the composition disclosed herein is in the form of a composition comprising an oily, such as anhydrous, continuous phase; in this case, the composition may comprise an amount of water of less than 5% by weight, such as less than 1% by weight of the total weight of the composition.

The composition disclosed herein may be in the form of a colored or non-colored skincare composition, in the form of a sun protection composition or makeup remover composition, or in the form of a hygiene composition. If the composition disclosed herein comprises at least one cosmetic active material, it may then be used as a non-therapeutic treatment or care base for the skin, such as the hands or face, or for the lips (lip balms, protecting the lips from cold, sun and/or wind), or an artificial tanning product for the skin.

The composition disclosed herein may also be in the form of a colored skin makeup product, for example, a face makeup product such as a blusher, rouge or eyeshadow, a body makeup product such as a semi-permanent tattooing product, or a lip makeup product such as a lipstick or lipgloss, possibly having non-therapeutic treatment or care properties, a product for making up the epidermal derivatives, such as a nail varnish, mascara or eyeliner, or a haircare or hair colouring product.

In one embodiment, the composition disclosed herein is in the form of a lipstick or lipgloss.

In one embodiment, the composition disclosed herein should be physiologically acceptable (for example, cosmetically acceptable), i.e., it should be non-toxic and capable of application to the skin, epidermal derivatives or lips of human beings.

The term "cosmetically acceptable medium" means the medium comprises at least one property chosen from being pleasant in taste, feel, appearance and odor and capable of being applied for a number of days in the course of a number of months.

The composition disclosed herein may be manufactured by known methods which are generally employed in the cosmetic field.

Other than in the examples, or where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. The following examples are intended to illustrate the invention without limiting the scope as a result. The amounts are given as percentages by weight of the total weight of the composition.

Example 17

Lipstick

| Material | % wt |
| --- | --- |
| Example 11 | 22.0 |
| Ester of dodecanediol and polyethylene glycol (Slfacos ST9) | 11.0 |
| Triglyceride of 2-decyltetradecanoic acid | 20.0 |
| Hydsrogenated polyisodecane | 10.0 |
| Distearyl maleate | 11.0 |
| Octacosanyl stearate | 2.5 |
| Mixture of triglycerides Lauric (50), myristic (20), palmitic (10) and stearic (10)) | 2.0 |
| Polyethylene wax | 5.0 |
| Hectorite | 3.0 |
| Pigments | qs |
| Preservatives | qs |

The oily phase was produced by mixing the preservative, all the oils and the paste (ethers of dodecanediol (22 mol) and of polyethylene glycol (45 EO)).

Then the hectorite was ground in the oily phase on a triple-roll mill.

The pigments were subsequently ground in the mixture of the hectorite and the oily phase.

The resulting mixture was added to a pan together with the waxes and the mixture was heated at 105° C. for two hours, with homogenization using a Rayneri apparatus.

No fragrance was added instead the sticks were simply demolded.

The above formula exhibited good gloss retention at 1 hour and did not migrate at 1 hour. It additionally possessed good properties in terms of application (slip), comfort, gloss (on application and over time) and color retention following challenge.

Example 2

Comparative

The above formula was produced again, but replacing Example 11 with the castor oil ester of succinic acid and isostearic acid of US 2004/0241198.

The composition according to the present disclosure showed better oxidative stability, not developing an odor with time and improved line definition and its color retention following challenge was greater than that of the comparative composition Moreover, the composition according to the present disclosure went on more thickly.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth hereinabove but rather that the claims be construed as encompassing all the features of patentable novelty which reside in the present invention, including all features which would be treated as equivalents thereof by those skilled in the art to which the invention pertains.

What is claimed is:

1. A composition, comprising, in a cosmetically acceptable medium, i) a Guerbet capped polyester conforming to the following structure:

A-(B-C)$_x$-B-A wherein:
A is

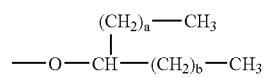

wherein;
a in an integer ranging from 3 to 11;
b in an integer ranging from 5 to 19, with the proviso that b=a+2;
B is —C(O)—CH$_2$—CH$_2$—C(O)—
C is a mixture of compounds conforming to the following structure:

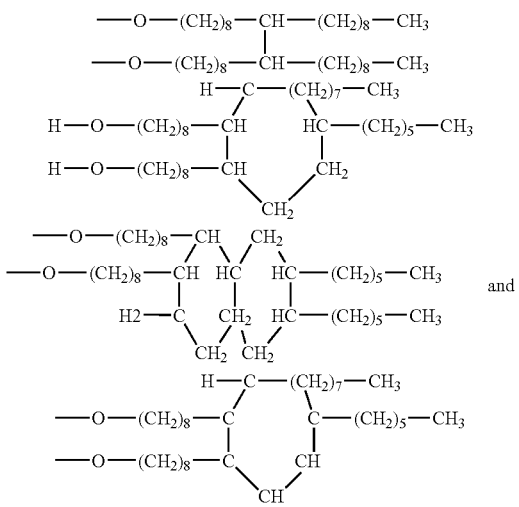

wherein;
x is an integer ranging from 3 to 40,
with a) at least one aliphatic monocarboxylic acid and b) at least one aliphatic dicarboxylic acid, ii) at least one oil of a molar mass ranging from 650 to 10 000 g/mol, and iii) at least one colorant.

2. A composition of claim 1 wherein a is 3 and b is 5.
3. A composition of claim 1 wherein a is 7 and b is 9.
4. A composition of claim 1 wherein a is 9 and b is 11.
5. A composition of claim 1 wherein a is 11 and b is 13.
6. A composition of claim 1 wherein a is 13 and b is 15.
7. A composition of claim 1 wherein a is 15 and b is 17.
8. A composition of claim 1 wherein a is 17 and b is 19.
9. A composition according to claim 1, wherein the composition is in a form chosen from lipsticks, lipglosses, blushers, eyeshadows, mascaras, eyeliners, nail varnishes, artificial skin tanning products, haircare products, hair coloring products.
10. A composition according to claim 1, wherein the at least one colorant is chosen from dyes, which are soluble or dispersible in the composition, pigments, and nacres.
11. A composition according to claim 1, further comprising at least one wax chosen from polyethylene waxes with a molecular weight ranging from 400 to 800 g/mol.

* * * * *